United States Patent
Kini et al.

(10) Patent No.: US 11,745,696 B2
(45) Date of Patent: Sep. 5, 2023

(54) ADAPTIVE DYNAMIC LAP BELT POSITION CONTROL SYSTEM

(71) Applicant: GM Global Technology Operations LLC, Detroit, MI (US)

(72) Inventors: Naresh Kini, Bengaluru (IN); Pramod Joshi, Bengaluru (IN); Ramachandra M R Rao, Bangalore (IN)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 17/562,151

(22) Filed: Dec. 27, 2021

(65) Prior Publication Data

US 2023/0202423 A1 Jun. 29, 2023

(51) Int. Cl.
*B60R 22/26* (2006.01)
*B60R 22/195* (2006.01)
*B60R 22/22* (2006.01)
*B60R 22/18* (2006.01)

(52) U.S. Cl.
CPC ............ *B60R 22/22* (2013.01); *B60R 22/195* (2013.01); *B60R 22/1951* (2013.01); *B60R 22/1954* (2013.01); *B60R 22/1958* (2013.01); *B60R 22/26* (2013.01); *B60R 2022/1818* (2013.01); *B60R 2022/1957* (2013.01)

(58) Field of Classification Search
CPC . B60R 22/1951; B60R 22/201; B60R 22/206; B60R 22/26; B60R 2022/1957; B60R 2022/207
See application file for complete search history.

(56) References Cited

U.S. PATENT DOCUMENTS

| | | | | |
|---|---|---|---|---|
| 8,606,465 B2* | 12/2013 | Wang | ...................... | B60R 21/01 701/1 |
| 10,569,738 B2* | 2/2020 | Thomas | .................. | B60R 22/48 |
| 11,059,453 B2* | 7/2021 | Thomas | ................. | B60N 2/002 |
| 2002/0089164 A1* | 7/2002 | Rouhana | .................. | B60R 22/02 280/801.1 |
| 2009/0322067 A1* | 12/2009 | Nezaki | .................... | B60R 22/26 297/474 |
| 2011/0057432 A1* | 3/2011 | You | ......................... | B60R 22/20 280/804 |
| 2012/0146385 A1* | 6/2012 | Russell | ............... | B60R 22/1951 297/480 |
| 2013/0009391 A1* | 1/2013 | Miller | ..................... | B60R 21/18 280/806 |
| 2015/0217720 A1* | 8/2015 | Palaniappan | ........... | B60R 22/26 280/804 |
| 2015/0307060 A1* | 10/2015 | Arnold | .................. | B60R 22/201 297/469 |

(Continued)

FOREIGN PATENT DOCUMENTS

DE 102008056678 B3 * 8/2010 ........... B60R 22/022
FR 2933351 A1 * 1/2010 ......... B60R 22/1951

*Primary Examiner* — Barry Gooden, Jr.
(74) *Attorney, Agent, or Firm* — CANTOR COLBURN LLP (57) ABSTRACT

A vehicle seat system includes a seat including a seat back and a seat base and a passive restraint system mounted adjacent to the seat. The passive restraint system includes a lap belt. A belt adjuster is mounted at the seat. The belt adjuster includes a member operable to engage and shift the lap belt away from the seat back upon being exposed to a selected deceleration force.

16 Claims, 6 Drawing Sheets

(56) References Cited

U.S. PATENT DOCUMENTS

| | | | |
|---|---|---|---|
| 2020/0079317 A1* | 3/2020 | Jaradi | B60R 22/1958 |
| 2020/0180554 A1* | 6/2020 | Song | B60R 21/013 |
| 2021/0380067 A1* | 12/2021 | Hammadi | B60R 22/20 |
| 2022/0017039 A1* | 1/2022 | Hammadi | B60R 22/26 |
| 2022/0153225 A1* | 5/2022 | Hicke | B60R 22/26 |

* cited by examiner

ADAPTIVE DYNAMIC LAP BELT POSITION CONTROL SYSTEM

INTRODUCTION

The subject disclosure relates to the art of vehicles and, more particularly, to an adaptive dynamic lap belt position control system for a vehicle.

Almost all modern vehicles include a passive restraint system including a lap belt and a shoulder belt. The passive restraint system limits an occupant's forward excursion during a sudden deceleration such as may occur during a frontal crash event. During the sudden vehicle deceleration, occupant position plays a role in how the deceleration forces are distributed on the body. For example, depending on hip position and body placement, an occupant may submarine forward. That is, the occupant's hips may migrate under the lap belt. Accordingly, it is desirable to provide a system that limits forward hip excursion in a vehicle during a sudden deceleration

SUMMARY

In accordance with a non-limiting example, a vehicle seat system includes a seat including a seat back and a seat base and a passive restraint system mounted adjacent to the seat. The passive restraint system includes a lap belt. A belt adjuster is mounted at the seat. The belt adjuster includes a member operable to engage and shift the lap belt away from the seat back upon being exposed to a selected deceleration force.

In addition to one or more of the features described above or below, or as an alternative, further embodiments could include wherein the belt adjuster includes a guide track, the member being constrained to selectively move along the guide track.

In addition to one or more of the features described above or below, or as an alternative, further embodiments could include wherein the belt adjuster includes a housing mounted to the seat base, the housing including an outer surface, the guide track being formed in the outer surface.

In addition to one or more of the features described above or below, or as an alternative, further embodiments could include wherein the member is recessed relative to the housing in a first configuration and projects outwardly from the outer surface in a second configuration.

In addition to one or more of the features described above or below, or as an alternative, further embodiments could include wherein the belt adjuster includes an activation mechanism operatively connected to the member, the activation mechanism being operable to shift the member along the guide track upon being exposed to a deceleration exceeding a predetermined threshold.

In addition to one or more of the features described above or below, or as an alternative, further embodiments could include wherein the activation mechanism comprises a pre-tensioned spring.

In addition to one or more of the features described above or below, or as an alternative, further embodiments could include wherein the activation mechanism includes a piston arranged in a cylinder, the piston being coupled to the member.

In addition to one or more of the features described above or below, or as an alternative, further embodiments could include wherein the activation mechanism includes a motor operatively connected to the member.

In addition to one or more of the features described above or below, or as an alternative, further embodiments could include wherein the activation mechanism includes a pyrotechnic device functionally connected to the member.

In addition to one or more of the features described above or below, or as an alternative, further embodiments could include a sensor configured to detect a vehicle deceleration and a controller operatively connected to the sensor and the activation mechanism, the controller being operative to command the activation mechanism to drive the member to engage and shift the lap belt away from the seat back when the sensor detects a vehicle deceleration exceeding a predetermined threshold.

In accordance with another non-limiting example, a vehicle includes a plurality of wheels and a body supported by the plurality of wheels. The body defines a passenger compartment. A vehicle seat system is arranged in the passenger compartment. The vehicle seat system includes a seat including a seat back and a seat base. A passive restraint system is mounted adjacent to the seat. The passive restraint system includes a lap belt. A belt adjuster is mounted at the seat. The belt adjuster includes a member operable to engage and shift the lap belt away from the seat back upon being exposed to a selected deceleration force.

In addition to one or more of the features described above or below, or as an alternative, further embodiments could include wherein the belt adjuster includes a guide track, the member being constrained to selectively move along the guide track.

In addition to one or more of the features described above or below, or as an alternative, further embodiments could include wherein the belt adjuster includes a housing mounted to the seat base, the housing including an outer surface, the guide track being formed in the outer surface.

In addition to one or more of the features described above or below, or as an alternative, further embodiments could include wherein the member is recessed relative to the housing in a first configuration and projects outwardly from the outer surface in a second configuration.

In addition to one or more of the features described above or below, or as an alternative, further embodiments could include wherein the belt adjuster includes an activation mechanism operatively connected to the member, the activation mechanism being operable to shift the member along the guide track upon being exposed to a deceleration exceeding a predetermined threshold.

In addition to one or more of the features described above or below, or as an alternative, further embodiments could include wherein the activation mechanism comprises a pre-tensioned spring.

In addition to one or more of the features described above or below, or as an alternative, further embodiments could include wherein the activation mechanism includes a piston arranged in a cylinder, the piston being coupled to the member.

In addition to one or more of the features described above or below, or as an alternative, further embodiments could include wherein the activation mechanism includes one of a motor operatively connected to the member and a pyrotechnic device functionally connected to the member.

In addition to one or more of the features described above or below, or as an alternative, further embodiments could include a sensor configured to detect a vehicle deceleration and a controller operatively connected to the sensor and the activation mechanism, the controller being operative to command the activation mechanism to drive the member to engage and shift the lap belt away from the seat back when the sensor detects a vehicle deceleration exceeding a predetermined threshold.

Still further disclosed in accordance with a non-limiting example is a vehicle seat system having a seat including a seat back and a seat base and a passive restraint system mounted adjacent to the seat. The passive restraint system includes a lap belt. A belt adjuster is mounted at the seat. The belt adjuster includes a member operable to engage and shift the lap belt away from the seat back upon being exposed to a selected deceleration force. An activation mechanism is operatively connected to the member. A control system is connected to the activation mechanism. The control system includes a central processing unit (CPU), an activation module, and a non-volatile memory having stored thereon a set of instructions, which when executed by the CPU, causes the CPU to instruct the activation module to trigger the activation mechanism to release the member to move the lap belt in response to a sensed deceleration event having the selected deceleration force.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

The following description is merely exemplary in nature and is not intended to limit the present disclosure, its application or uses. It should be understood that throughout the drawings, corresponding reference numerals indicate like or corresponding parts and features. As used herein, the term module refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

Figure 1:
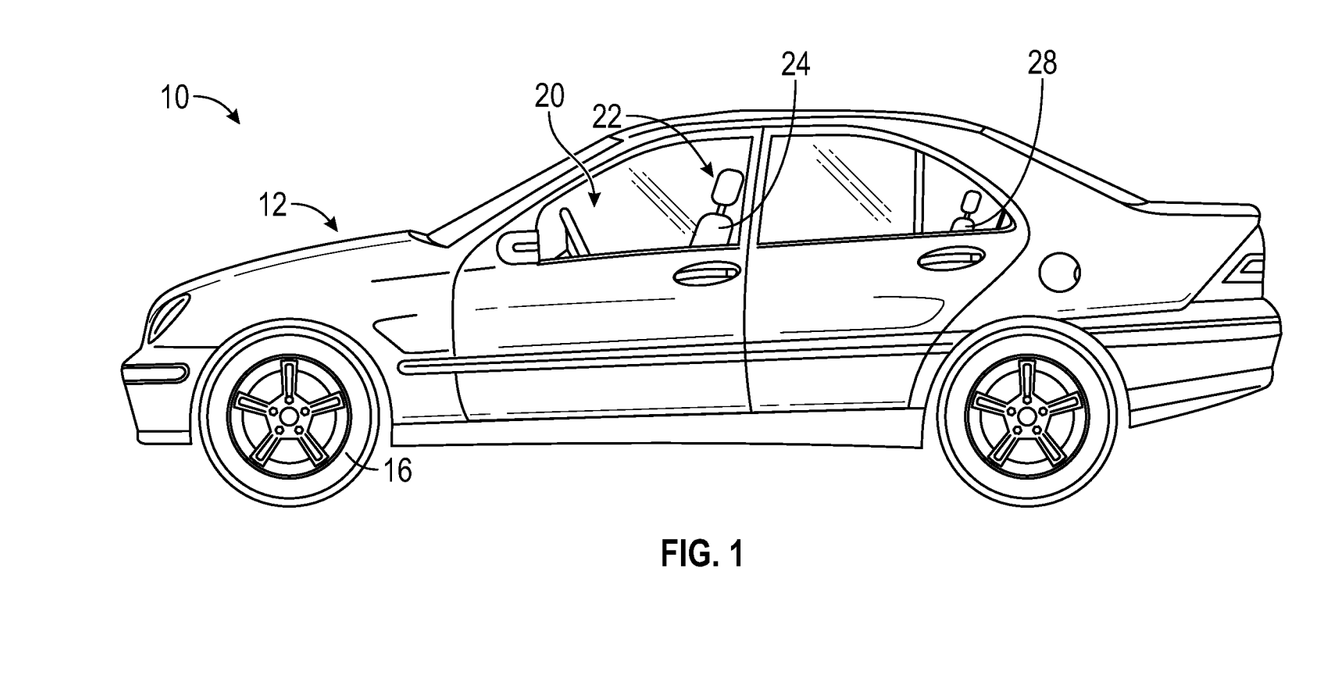
FIG. 1 depicts a vehicle including an adaptive dynamic lap belt position control system, in accordance with a non-limiting example.

A vehicle, in accordance with a non-limiting example, is indicated generally at 10 in FIG. 1. Vehicle 10 includes a body 12 supported on a frame (not shown) and a plurality of wheels, one of which is indicated at 16. Body 12 includes a passenger compartment 20 that includes at least one seat system 22. Seat system 22 includes a driver's seat 24 and a passenger seat 26 (FIG. 2) as well as rear seats, one of which is indicated at 28.

Figure 2:
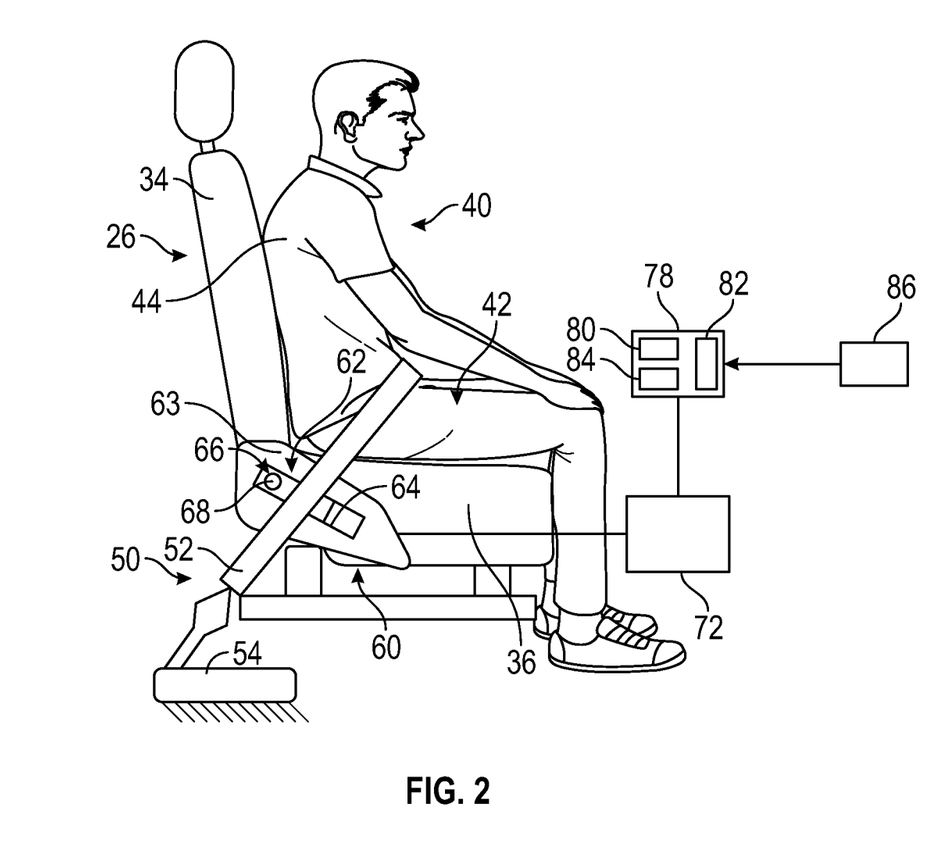
FIG. 2 depicts a seat system including an adaptive dynamic lap belt position control system in a pre-deceleration event position, in accordance with a non-limiting example.

Referring to FIG. 2, in accordance with a non-limiting example passenger seat 26 includes a seat back 34 and a seat base 36. An occupant 40 sits in seat base 36 exposing a lap 42. Occupant 40 includes an upper torso 44 that may rest upon seat back 34. A passive restraint system 50 is mounted at passenger seat 26. Passive restraint system 50 includes a lap belt 52 tethered to an anchor 54 fixedly secured in vehicle 10. Passive restraint system 50 may also include a shoulder belt (not shown). In a non-limiting example, passenger seat 26 includes an adaptive dynamic lap belt position control system in the form of a belt adjuster 60 that shifts lap belt 52 away from seat back 34 during sudden deceleration or rapid change in momentum (forward or rearward) such as may be caused by heavy braking, an undesired interaction with another object, and the like. At this point, it should be understood that while described in terms of passenger seat 26, driver's seat 24 and rear seat 28 may include similar structure.

Figure 3:
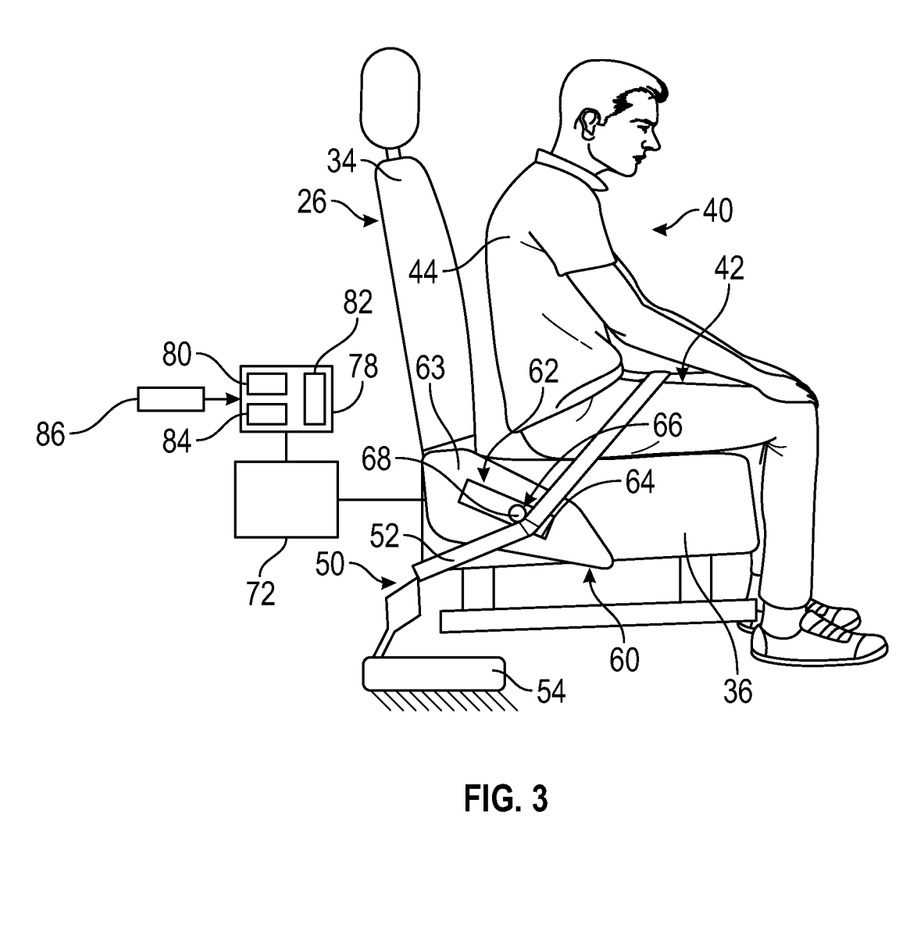
FIG. 3 depicts the seat system of FIG. 2 with the adaptive dynamic lap belt position control system in a post deceleration event position, in accordance with a non-limiting example.

In a non-limiting example, belt adjuster 60 includes a housing 62 having an outer surface 63 within which is defined a guide track 64. A member 66, which may take the form of a knob 68, selectively travels along guide track 64 to shift lap belt 52 away from seat back 34. In a non-limiting example, belt adjuster 60 includes an activation mechanism 72 operatively connected with member 66. Activation mechanism 72 drives member 66 along guide track 64 when vehicle 10 experiences an acceleration event, which may take the form of a sudden deceleration, that exceeds a predetermined threshold. For example, in a forward collision in which vehicle 10 suddenly decelerates at a rate that exceeds a selected rate, activation mechanism 72 drives member 66 along guide track 64 forcing lap belt 52 forward as shown in FIG. 3. In a non-limiting example, triggering of activation mechanism 72 may be tied to an activation of passive restraint system 50, or another supplemental restraint system such as an airbag. In this manner, the adaptive dynamic lap belt position control system prevents or mitigates occupant excursions, such as submarining that may place undue forces on occupant 40.

In a non-limiting example, a controller 78 may be connected to activation mechanism 72. Controller 78 includes a central processing unit (CPU) 80, a non-volatile memory module 82, and an activation module 84. Non-volatile memory module 82 has stored thereon instructions, which when executed by CPU 80, causes CPU 80 to instruct activation module 84 to trigger activation mechanism 72 and release member 66. A sensor 86, which may take the form of an accelerometer, is connected to controller 78. Non-volatile memory module 82 may store a set of instructions which is passed to CPU 80 and activation module 84 upon sensor 86 detecting a deceleration that exceeds a stored threshold value. The set of instructions may include operating activation mechanism 72 to fire member 66 along guide track 74 thereby forcing lap belt 52 forward (FIG. 3).

Figure 4:
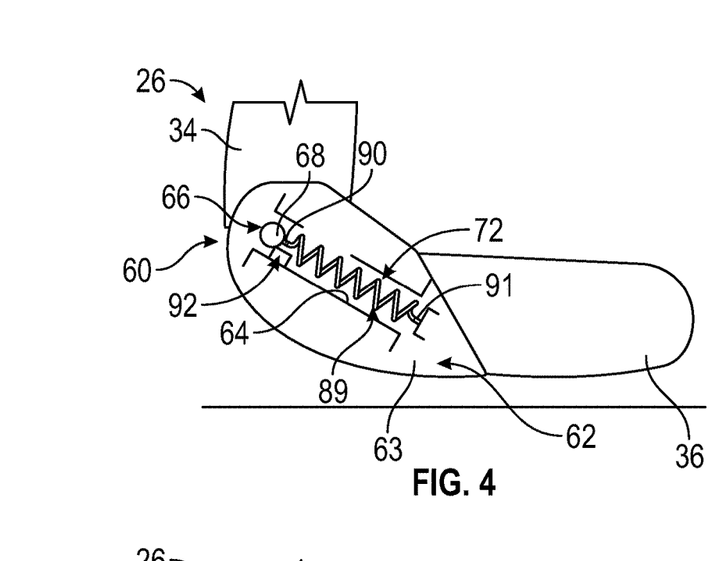
FIG. 4 depicts the adaptive dynamic lap belt position control system of FIG. 2 having an activation mechanism, in accordance with one non-limiting example.

In a non-limiting example shown in FIG. 4, activation mechanism 72 may take the form of a pre-loaded spring 89 disposed in housing 62. Pre-loaded spring 89 includes a first end 90 coupled to member 66 and a second end 91 anchored in housing 62. A locking element 92 may restrain pre-loaded spring 89 under tension until vehicle 10 experiences a deceleration that exceeds the stored threshold value. In a non-limiting example, locking element 92 may be released by activation module 84. Once released, pre-loaded spring 89 contracts pulling member 66 along guide track 64 moving lap belt away from seat back 34.

Figure 5:
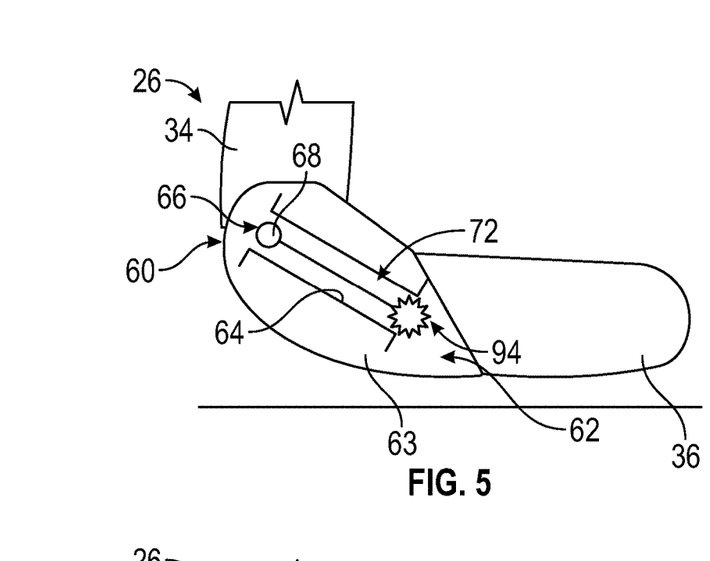
FIG. 5 depicts the adaptive dynamic lap belt position control system of FIG. 2 having an activation mechanism, in accordance with another non-limiting example.

In a non-limiting example shown in FIG. 5, activation mechanism 72 includes a pyrotechnic device 94 functionally connected to member 66. Pyrotechnic device 94 creates rapidly expanding gases, such as used in an air bag, that create forces which cause member 66 to rapidly shift lap belt 52 away from seat back 34 when vehicle 10 experiences a deceleration that exceeds the stored threshold value. In a non-limiting example, pyrotechnic device 94 may be detonated or activated by activation module 84. Once released, the expanding gases drive member 66 along guide track 64 moving lap belt away from seat back 34.

Figure 6:
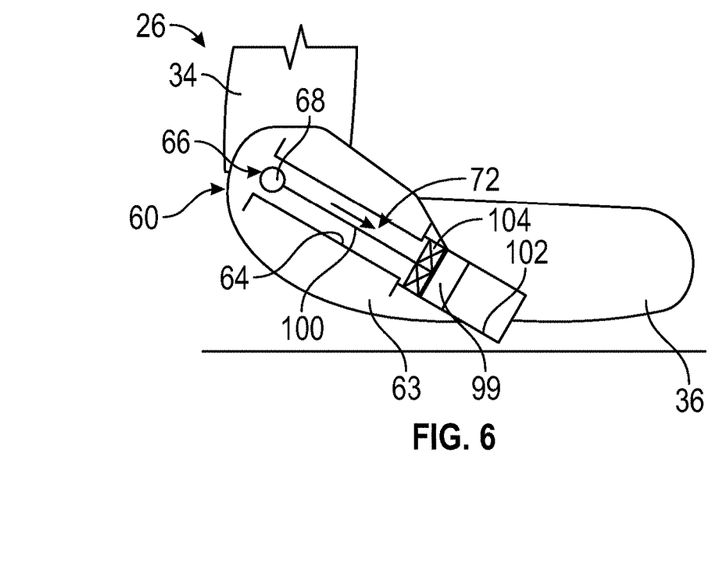
FIG. 6 depicts the adaptive dynamic lap belt position control system of FIG. 2 having an activation mechanism, in accordance with yet another non-limiting example.

In a non-limiting example depicted in FIG. 6, activation mechanism 72 includes a piston 99 operatively connected to member 66 through a connector 100. Piston 99 rides in a cylinder 102. In a non-limiting example, piston 99 may be rapidly shifted along cylinder 102 when exposed to forces, such as rapidly expanding gases or fluids from a device 104. In a non-limiting example, device 104 may be detonated or activated by activation module 84. Once activated, the expanding gases rapidly drive piston 99 along cylinder 102 forcing member 66 along guide track 64 moving lap belt away from seat back 34.

Figure 7:
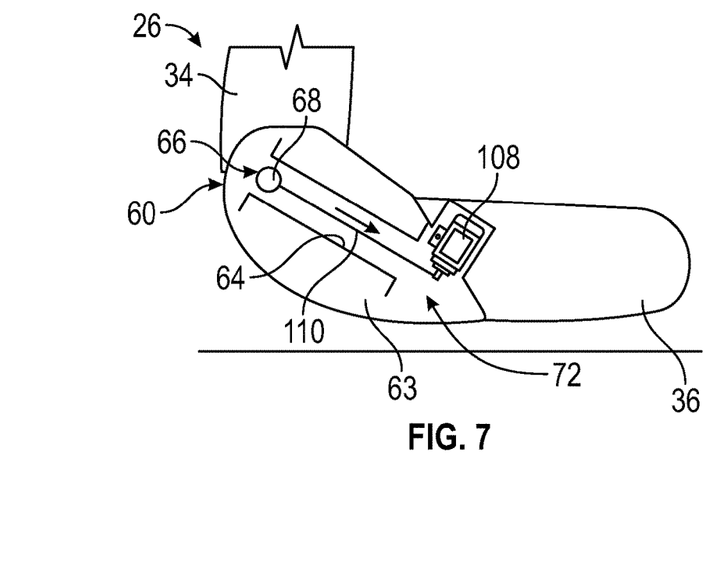
FIG. 7 depicts the adaptive dynamic lap belt position control system of FIG. 2 having an activation mechanism, in accordance with still another non-limiting example.

In a non-limiting example depicted in FIG. 7, activation mechanism 72 includes a motor 108 mechanically connected to member 66 through a connector 110. In a non-limiting example, motor 108 may be powered by activation module 84 along guide track 64 to rapidly shift member 66. In a non-limiting example, motor 108 activated by activation module 84. Once activated, motor 108 swiftly shortens connector 110 to rapidly drive member 66 along guide track 64 to move lap belt away from seat back 34.

Figure 8:
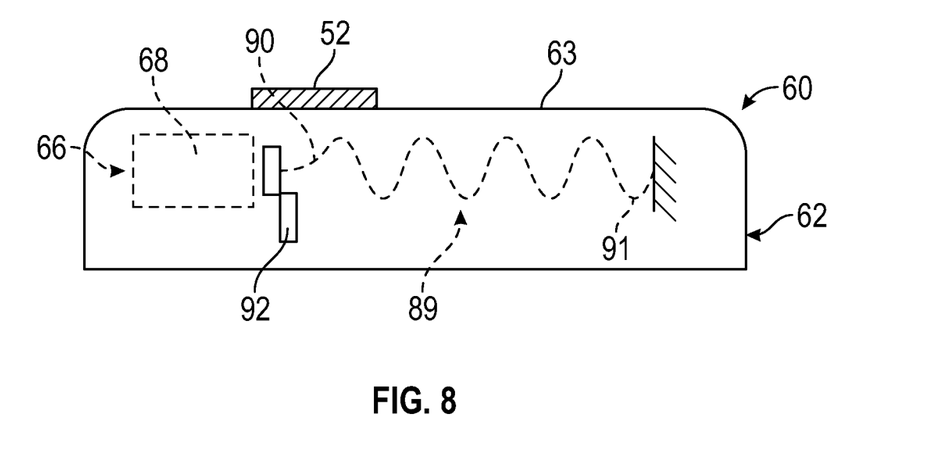
FIG. 8 depicts the adaptive dynamic lap belt position control system of FIG. 2 showing a lap belt engagement member in a non-deployed configuration, in accordance with one non-limiting example.
Figure 9:
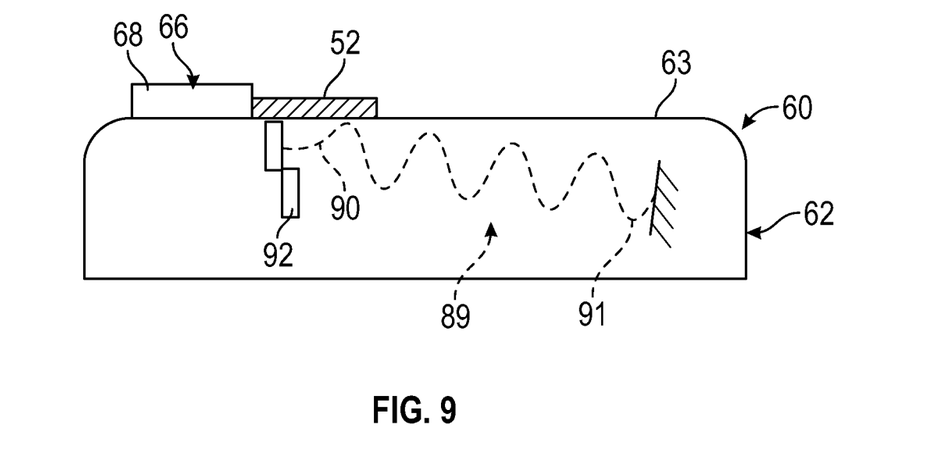
FIG. 9 depicts the adaptive dynamic lap belt position control system of FIG. 8 showing the lap belt engagement member in a deployed configuration, in accordance with one non-limiting example.

In a non-limiting example depicted in FIGS. 8 and 9, member 66 may be recessed withing housing 62 prior to activation of belt adjuster 60 as shown in FIG. 8. When sensor 86 detects a deceleration above a predetermined threshold, member 66 is shifted or deployed outwardly to extend beyond outer surface 63 of housing 62 as shown in FIG. 9. Various mechanisms may be used to shift member 66 outwardly. Solenoids, ramps, mechanical actuators, electrical actuators, and the like can be arranged to shift or "pop" member 66 outward. At this point, controller 78 releases, for example lock element 92 causing activation mechanism 72 to rapidly shift lap belt 52 away from seat back 34. In this manner, prior to activation, member 66 does not interfere with occupant seating, belt movement and deployment but after a deceleration event is deployed to engage and shift lap belt 52 forward to prevent occupant submarining.

Figure 10:
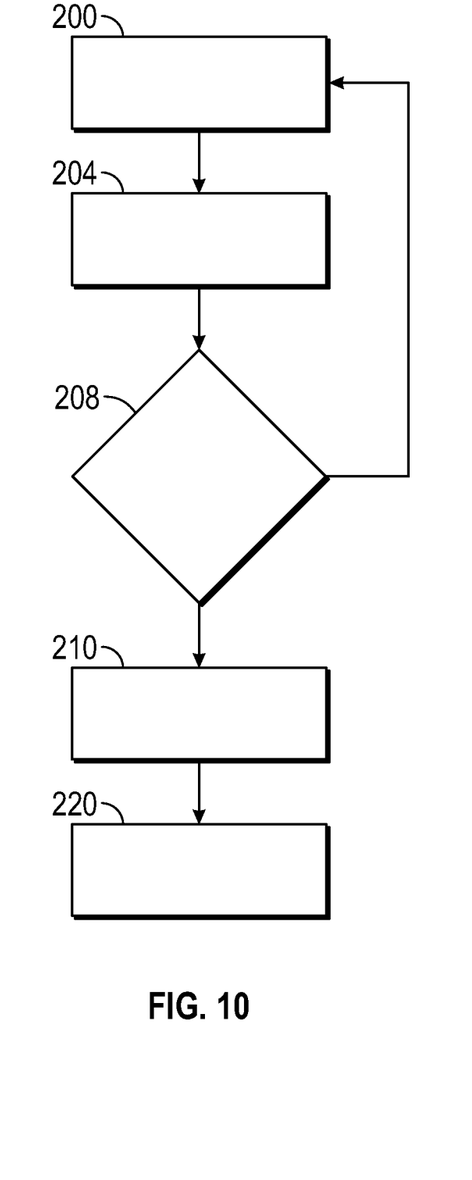
FIG. 10 depicts a block diagram illustrating a method of adaptively adjusting a lap belt position, in accordance with a non-limiting example.

In a non-limiting example depicted in FIG. 10, controller 78 monitors sensors 86 for a change in momentum as shown in box 200. When a change in momentum is detected in box 204, a determination is made by CPU 80 in block 208 whether the predetermined threshold stored in non-volatile memory 82 and/or CPU 80 has been exceeded. If not, controller 78 continues to monitor in box 200. If the change in momentum exceeds the predetermined threshold, CPU acts on instructions in non-volatile memory 82 to trigger activation mechanism 72 to shift member 66 outward in block 210 and subsequently shift member 66 forward to move lap belt away from seat back 34 in block 212. The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof

What is claimed is:

1. A vehicle seat system for a vehicle comprising:
a seat including a seat back and a seat base;
a passive restraint system mounted adjacent to the seat, the passive restraint system including a lap belt including an anchor fixedly mounted to the vehicle; and
a belt adjuster mounted at the seat, the belt adjuster including a member operable to engage the lap belt at a position spaced from the anchor and shift the lap belt away from the seat back upon being exposed to a selected deceleration force, the belt adjuster including a housing mounted to the seat base, the housing including an outer surface and a guide track defined in the outer surface, the member being constrained to selectively move along the guide track.

2. The vehicle seat system according to claim 1, wherein the member is recessed relative to the housing in a first configuration and projects outwardly from the outer surface in a second configuration.

3. The vehicle seat system according to claim 2, wherein the belt adjuster includes an activation mechanism operatively connected to the member, the activation mechanism being operable to shift the member along the guide track upon being exposed to a deceleration exceeding a predetermined threshold.

4. The vehicle seat system according to claim 3, wherein the activation mechanism comprises a pre-tensioned spring.

5. The vehicle seat system according to claim 3, wherein the activation mechanism includes a piston arranged in a cylinder, the piston being coupled to the member.

6. The vehicle seat system according to claim 3, wherein the activation mechanism includes a motor operatively connected to the member.

7. The vehicle seat system according to claim 3, wherein the activation mechanism includes a pyrotechnic device functionally connected to the member.

8. The vehicle seat system according to claim 3, further comprising:
a sensor configured to detect a vehicle deceleration; and
a controller operatively connected to the sensor and the activation mechanism, the controller being operative to command the activation mechanism to drive the member to engage and shift the lap belt away from the seat back when the sensor detects a vehicle deceleration exceeding a predetermined threshold.

9. A vehicle comprising:
a body defining a passenger compartment; and
a vehicle seat system arranged in the passenger compartment, the vehicle seat system comprising:
a seat including a seat back and a seat base;
a passive restraint system mounted adjacent to the seat, the passive restraint system including a lap belt including a fixed anchor mounted in the passenger compartment; and
a belt adjuster mounted at the seat, the belt adjuster including a member operable to engage the lap belt at a position spaced from the anchor and shift the lap belt away from the seat back upon being exposed to a selected deceleration force, the belt adjuster including a housing mounted to the seat base, the housing including an outer surface and a guide track defined in the outer surface, the member being constrained to selectively move along the guide track.

10. The vehicle according to claim 9, wherein the member is recessed relative to the housing in a first configuration and projects outwardly from the outer surface in a second configuration.

11. The vehicle according to claim 10, wherein the belt adjuster includes an activation mechanism operatively connected to the member, the activation mechanism being operable to shift the member along the guide track upon being exposed to a deceleration exceeding a predetermined threshold.

12. The vehicle according to claim 11, wherein the activation mechanism comprises a pre-tensioned spring.

13. The vehicle according to claim 11, wherein the activation mechanism includes a piston arranged in a cylinder, the piston being coupled to the member.

14. The vehicle according to claim 11, wherein the activation mechanism includes one of a motor operatively connected to the member, and a pyrotechnic device functionally connected to the member.

15. The vehicle according to claim 11, further comprising:
a sensor configured to detect a vehicle deceleration; and
a controller operatively connected to the sensor and the activation mechanism, the controller being operative to command the activation mechanism to drive the member to engage and shift the lap belt away from the seat back when the sensor detects a vehicle deceleration exceeding a predetermined threshold.

16. A vehicle seat system for a vehicle comprising:
a seat including a seat back and a seat base;
a passive restraint system mounted adjacent to the seat, the passive restraint system including a lap belt including a fixed anchor;
a belt adjuster mounted at the seat, the belt adjuster including a member operable to engage the lap belt at a position spaced from the fixed anchor and shift the lap belt away from the seat back upon being exposed to a selected deceleration force, the belt adjuster including a housing mounted to the seat base, the housing including an outer surface and a guide track defined in the outer surface, the member being constrained to selectively move along the guide track;
an activation mechanism operatively connected to the member; and
a control system operatively connected to the activation mechanism, the control system including a central processing unit (CPU), an activation module, and a non-volatile memory having stored thereon a set of instructions, which when executed by the CPU, causes the CPU to instruct the activation module to trigger the activation mechanism to release the member to move the lap belt in response to a sensed deceleration event having the selected deceleration force.

\* \* \* \* \*